(12) United States Patent
Schipani et al.

(10) Patent No.: US 12,745,191 B2
(45) **Date of Patent: *Sep. 22, 2026**

(54) METHODS FOR MITIGATING RADIO-FREQUENCY RADIATION EXPOSURE USING POWER INTERRUPTERS

(71) Applicant: Waterford Consultants, LLC, Frederick, MD (US)

(72) Inventors: Matthew Anthony Schipani, Vienna, VA (US); Thomas Walter Ferguson, Mechanicsburg, PA (US); Dipesh Ghanshyam Patel, Warrington, PA (US); Steven Baier-Anderson, Lothian, MD (US)

(73) Assignee: Waterford Consultants, LLC, Frederick, MD (US)

(*) Notice: Subject to any disclaimer, the term of this patent is extended or adjusted under 35 U.S.C. 154(b) by 173 days.

This patent is subject to a terminal disclaimer.

(21) Appl. No.: 18/614,413

(22) Filed: Mar. 22, 2024

(65) Prior Publication Data

US 2025/0301416 A1 Sep. 25, 2025

(51) Int. Cl.
*H04W 52/30* (2009.01)
*G08B 21/02* (2006.01)
(Continued)

(52) U.S. Cl.
CPC ............ *H04W 52/30* (2013.01); *G08B 21/02* (2013.01); *H04N 7/188* (2013.01); *H04N 23/611* (2023.01)

(58) Field of Classification Search
CPC .......... H04W 52/30; G08B 21/02; F16P 3/147
See application file for complete search history.

(56) References Cited

U.S. PATENT DOCUMENTS 4,875,023 A 10/1989 Maoz
6,111,503 A 8/2000 Javitt et al.
(Continued)

FOREIGN PATENT DOCUMENTS

EP 0982793 A2 3/2000
EP 1432155 A1 6/2004
(Continued)

OTHER PUBLICATIONS

Cooper, T.G. et al., "Occupational Exposure to Electromagnetic Fields at Radio Transmitter Sites," Health Protection Agency, Jun. 2007, 65 pages.
(Continued)

*Primary Examiner* — Nabil H Syed
(74) *Attorney, Agent, or Firm* — Kory D. Christensen

(57) ABSTRACT

A method for mitigating RF radiation exposure in an area of concern proximate to an RF radiation source includes operatively connecting one or more sensors to a processor, operatively connecting the processor to a relay disposed on an electrical path between an electrical input and an electrical output, the relay configured to selectively connect or disconnect the electrical input and the electrical output through the electrical path under control of the processor, operatively connecting the electrical input to a power supply for the RF radiation source, operatively connecting the electrical output to the RF radiation source, detecting, via the one or more sensors, that an object has entered the area of concern, and opening the relay, via the processor, to temporarily interrupt power to the RF radiation source at least in response to detection by the one or more sensors that the object has entered the area of concern.

26 Claims, 12 Drawing Sheets

(51) Int. Cl.
*H04N 7/18* (2006.01)
*H04N 23/611* (2023.01)

(56) References Cited

U.S. PATENT DOCUMENTS 8,804,566 B1 8/2014 Singh et al.
10,969,415 B2 4/2021 Schipani
12,394,303 B1 * 8/2025 Schipani ................ G08C 17/02
2004/0121807 A1 6/2004 Delbreil et al.
2004/0160362 A1 8/2004 Lecuyer
2004/0196813 A1 10/2004 Ofek et al.
2005/0137786 A1 6/2005 Breed et al.
2006/0252390 A1 11/2006 Bendov
2007/0202809 A1 8/2007 Lastinger et al.
2008/0094212 A1 4/2008 Breed
2009/0073662 A1 3/2009 Dahl
2009/0305742 A1 12/2009 Caballero et al.
2011/0309936 A1 * 12/2011 Nelson .................... F16P 3/142 340/686.6
2012/0231784 A1 9/2012 Kazmi
2013/0093625 A1 4/2013 Smith
2013/0234883 A1 9/2013 Ma et al.
2013/0281036 A1 10/2013 Kolokotronis
2014/0218255 A1 8/2014 Sanford et al.
2014/0370929 A1 12/2014 Khawand et al.
2015/0009044 A1 * 1/2015 Weinberg ............... G08C 17/02 340/870.07
2015/0237419 A1 8/2015 Lee et al.
2016/0112132 A1 4/2016 Gerszberg et al.
2016/0321890 A9 11/2016 Woosnam
2017/0085127 A1 3/2017 Leabman
2017/0150306 A1 5/2017 Lejeune, Jr.
2018/0080966 A1 3/2018 Schipani
2018/0136625 A1 * 5/2018 Graves .................... F16P 3/142
2018/0349654 A1 * 12/2018 Takeshima ......... G06K 7/10366
2019/0258866 A1 8/2019 Khadloya et al.
2020/0021421 A1 1/2020 Han et al.
2020/0263828 A1 * 8/2020 Yumuk ................... F16P 3/147
2021/0297104 A1 9/2021 Zhou et al.
2021/0297959 A1 9/2021 Zhou et al.
2022/0006507 A1 1/2022 Guan et al.
2022/0166454 A1 5/2022 Jaurigue et al.
2024/0314706 A1 * 9/2024 Sheppard ............... G06V 40/10

FOREIGN PATENT DOCUMENTS

WO 2006127115 A1 11/2006
WO 2013123913 A1 8/2013
WO 2016064503 A1 4/2016

OTHER PUBLICATIONS

Cleveland, Jr., Robert F. et al., "Evaluating Compliance with FCC Guidelines for Human Exposure to Radiofrequency Electromagnetic Fields," Federal Communications Commission Office of Engineering & Technology, Aug. 1997, 84 pages.
Non-Final Rejection mailed on Mar. 3, 2026, in related U.S. Appl. No. 18/614,430, 47 pages.
Restriction Requirement mailed on Mar. 12, 2026, in related U.S. Appl. No. 18/614,419, 6 pages.
Restriction Requirement mailed on Mar. 12, 2026, in related U.S. Appl. No. 18/614,424, 6 pages.

* cited by examiner

METHODS FOR MITIGATING RADIO-FREQUENCY RADIATION EXPOSURE USING POWER INTERRUPTERS

TECHNICAL FIELD

The present application relates to radio-frequency (RF) communication and, more specifically, to methods for mitigating RF radiation exposure in proximity to RF radiation sources, such as cell towers.

BACKGROUND

Wireless carriers are required by the Federal Communications Commission (FCC) and other government agencies to comply with a myriad of regulations and guidelines pertaining to RF emissions and human exposure at their transmission sites. In addition, the FCC has recently expanded the rules beyond wireless carriers to infrastructure firms, building owners, and any party with personnel performing work at or near a wireless transmission site.

Conventionally, owners of wireless transmission sites, such as cell towers, have placed printed warnings at or near the sites to warn personnel of the of risk of exposure to RF radiation levels that exceed the permissible limit, i.e., the maximum permissible exposure (MPE). However, such signs do nothing to tell the personnel whether the site is currently operational and therefore a hazard. Furthermore, the personnel may not see the signs or may choose to ignore them.

Similarly, barriers are an imperfect solution because they can interfere with network performance and, like signs, do not tell an on-site worker or other visitors whether RF radiation at the site exceeds the MPE. Workers can intentionally climb barriers or unknowingly enter areas where they are exposed to elevated levels of RF radiation, potentially subjecting the owner of the site to civil liability or regulatory action.

SUMMARY

The present disclosure includes RF infrastructure sentry (RFIS) systems and associated methods that solve the disadvantages with conventional approaches to complying with FCC regulations and mitigating RF radiation exposure in proximity to an RF radiation source, such as an RF antenna.

According to one aspect, a method is provided for mitigating RF radiation exposure in an area of concern proximate to an RF radiation source. The method includes operatively connecting one or more sensors to a processor and operatively connecting the processor to a relay disposed on an electrical path between an electrical input and an electrical output. The relay is configured to selectively connect or disconnect the electrical input and the electrical output through the electrical path under control of the processor. The method also includes operatively connecting the electrical input to a power supply for the RF radiation source and operatively connecting the electrical output to the RF radiation source. The method further includes detecting, via the one or more sensors, that an object has entered the area of concern. In addition, the method includes opening the relay, via the processor, to temporarily interrupt power to the RF radiation source at least in response to detection by the one or more sensors that the object has entered the area of concern.

In some configurations, the area of concern is a region proximate to the RF radiation source where a power density of RF radiation within the area of concern or RF radiation exposure to the object within the area of concern exceeds a predetermined threshold when the RF radiation source is in operation.

In other configurations, detecting that the object has entered the area of concern includes determining by an artificial intelligence (AI) camera that the object is a human.

In additional configurations, detecting that the object has entered the area of concern includes capturing one or more images via a camera, transmitting the one or more images captured by the camera via a network to a machine learning system configured to distinguish humans from other types of objects, and receiving an indication from the machine learning system whether the object is a human.

In various implementations, transmitting the one or more images captured by the camera via the network to the machine learning system includes transmitting the one or more images to a trained neural network.

In certain implementations, detecting that the object has entered the area of concern includes that the object has entered the area of concern using at least one of a proximity sensor, a motion detector, a barrier tip/lift sensor, or a photoelectric beam sensor.

In further implementations, the method includes restoring the power to the RF radiation source at least in response to the one or more sensors detecting that the object has exited the area of concern.

In many configurations, the electrical input, the electrical output, and the relay are components of a relay unit disposed remotely from a control unit including the processor, and the method further includes operatively connecting the processor of the control unit to the relay of the relay unit.

In some examples, the control unit includes a first communication interface configured to communicate with a second communication interface included in the relay unit, wherein the second communication interface is operatively connected to the relay, and the method further includes operatively connecting the first communication interface to the second communication interface.

In other examples, the first communication interface and the second communication interface are wireless interfaces.

In still other examples, the method further includes operatively connecting the processor to an RF monitoring system and monitoring, via the RF monitoring system, a power density of RF radiation within the area of concern or RF radiation exposure to the object within the area of concern. In such configurations, opening the relay to temporarily interrupt the power to the RF radiation source includes opening the relay at least in response to the power density of the RF radiation within the area of concern or the RF radiation exposure to the object within the area of concern exceeding a predetermined threshold.

In additional examples, the RF monitoring system is configured to monitor the RF radiation exposure to the object based, at least in part, on an amount of time that the object is within the area of concern, and wherein opening the relay to temporarily interrupt the power to the RF radiation source includes opening the relay at least in response to the RF radiation exposure to the object exceeding the predetermined threshold.

In some implementations, the method includes storing, in a memory, a log of each detected entry of each object into the area of concern.

In other implementations, storing the log of each detected entry of each object into the area of concern includes storing, in the log, at least one of a date of entry, a time of entry, a date of exit, a time of exit, and the power density of the RF radiation within the area of concern or the RF radiation exposure to the object within the area of concern as determined by the RF monitoring system.

In certain configurations, the method further includes capturing an image or video of the object and storing the image or the video in the log.

In additional configurations, the method further includes displaying a warning sign at least in response to the power density of the RF radiation within the area of concern or the RF radiation exposure to the object within the area of concern exceeding the predetermined threshold when the one or more sensors detect that the object has entered the area of concern.

In various configurations, displaying the warning sign includes displaying the warning sign using a sign projector configured for projecting the warning sign onto a surface in or proximate to the area of concern.

In select examples, projecting the warning sign includes projecting an indication of a time remaining to maximum permissible exposure (MPE) for the object.

In some examples, the method further includes emitting an audible warning at least in response to the power density of the RF radiation within the area of concern or the RF radiation exposure to the object within the area of concern exceeding the predetermined threshold when the one or more sensors detect that the object has entered the area of concern.

In additional implementations, the method further includes displaying a color-coded RF alert light at least in response to the power density of the RF radiation within the area of concern or the RF radiation exposure to the object within the area of concern exceeding the predetermined threshold.

In certain implementations, the method further includes sending an electronic alert at least in response to the power density of the RF radiation within the area of concern or the RF radiation exposure to the object within the area of concern exceeding the predetermined threshold when the one or more sensors detect that the object has entered the area of concern.

In some configurations, sending the electronic alert includes sending one or more of an email, a text message, or a push notification.

According to another aspect, a method is provided for mitigating RF radiation exposure in an area of concern proximate to an RF radiation source. The method includes detecting, by one or more sensors, that an object has entered or exited the area of concern proximate to the RF radiation source. The method also includes temporarily disconnecting the RF radiation source from a power source while the object is within the area of concern in response to detecting that the object has entered the area of concern. The method further includes logging, within a memory, one or both of the object entering or exiting the area of concern. The method additionally includes generating at least one of an audible warning or a visual warning to the object that has entered the area of concern.

In some implementations, the method further includes sending an electronic alert to a remote server that the object has exited or entered the area of concern.

In additional implementations, the electronic alert includes one or more of an email, a text message, or a push notification.

In further implementations, logging includes logging at least one of a date of entry, a time of entry, a date of exit, and a time of exit.

In certain implementations, the method further includes capturing an image or a video of the object and logging the image or the video within the memory.

In select limitations, generating the visual warning includes projecting a warning sign by a sign projector onto a surface in or proximate to the area of concern.

In some configurations, projecting the warning sign includes projecting an indication of a time remaining to a maximum permissible exposure (MPE) for the object.

In yet another aspect, a non-transitory computer-readable medium is provided. The non-transitory computer-readable medium stores program code that, when executed by one or more processors, cause the one or more processors to perform a method for mitigating RF radiation exposure in an area of concern proximate to an RF radiation source. The method includes detecting, by one or more sensors, that an object has entered or exited the area of concern proximate to the RF radiation source. The method also includes temporarily disconnecting the RF radiation source from a power source while the object is within the area of concern in response to detecting that the object has entered the area of concern. The method further includes logging, within a memory, one or both of the object entering or exiting the area of concern. In addition, the method includes generating at least one of an audible warning or a visual warning to the object that has entered the area of concern.

BRIEF DESCRIPTION OF THE DRAWINGS

The accompanying figures are provided by way of illustration and not by way of limitation. The foregoing aspects and other features of the disclosure are explained in the following description, taken in connection with the accompanying example figures relating to one or more embodiments, in which.

DETAILED DESCRIPTION

In the following description, specific details are set forth in order to provide a thorough understanding of embodiments of the present disclosure. However, it will be apparent that various embodiments may be practiced without these specific details. The figures and description are not intended to be restrictive, but are offered by way of illustration. Various changes may be made in the function and arrangement of elements without departing from the spirit and scope of the disclosure as set forth in the appended claims. Unless otherwise defined, all technical terms used herein have the same meaning as commonly understood by one of ordinary skill in the art to which this disclosure belongs.

Figure 1:
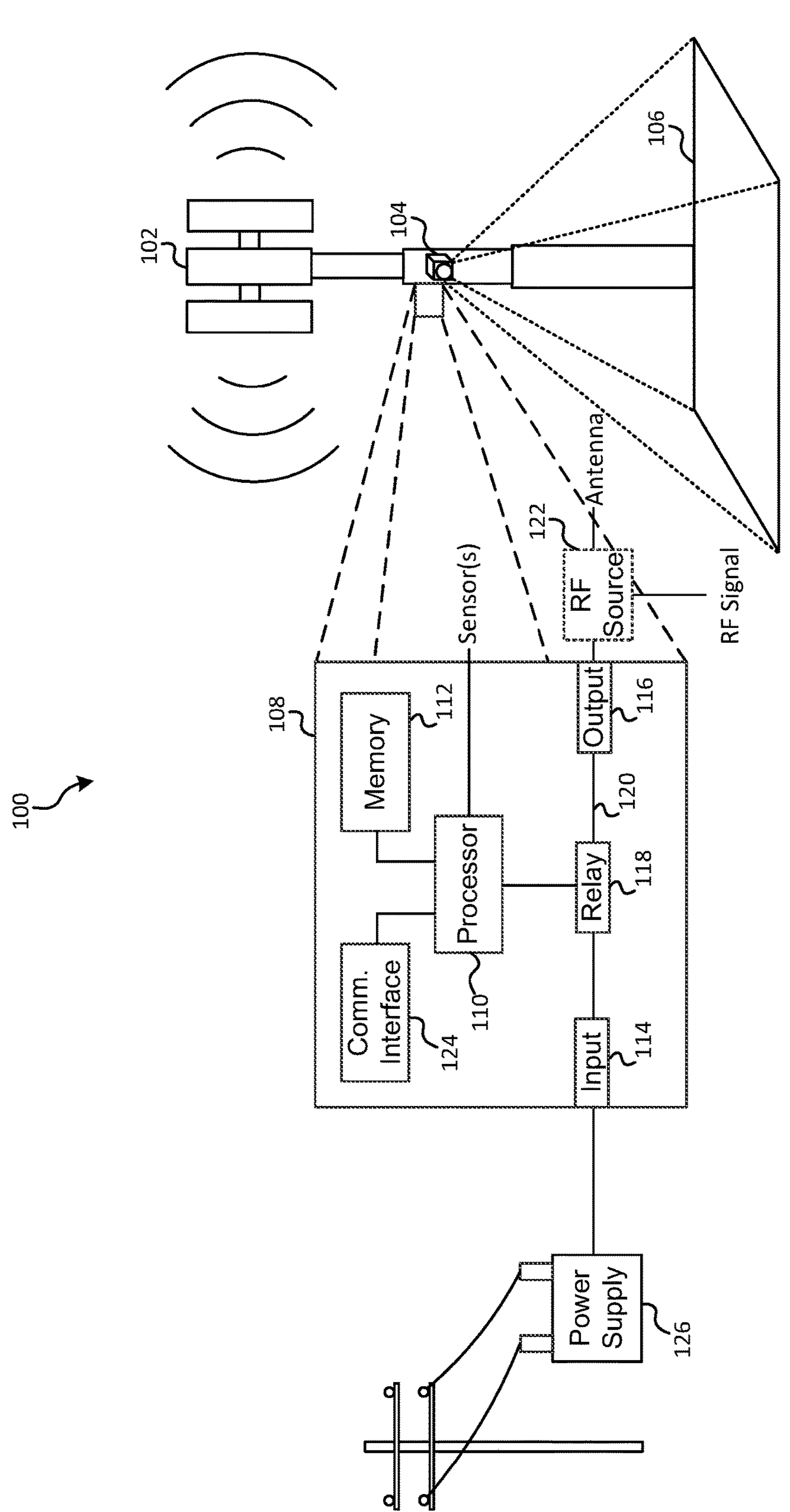
FIG. 1 is a schematic diagram of a configuration of an RF infrastructure sentry (RFIS) system.

FIG. 1 is a schematic diagram of an RF infrastructure sentry (RFIS) system 100 for mitigating RF radiation exposure in proximity to an RF radiation source 102, such as a cell tower including one or more RF antennas. Other RF radiation sources 102 may include, without limitation, radar facilities, land mobile radio (LMR) facilities, FM/AM/TV broadcast facilities, Project 25 (P25) communication facilities, satellite communication facilities, or the like.

The RFIS system 100 may include one or more sensors 104 configured to detect that an object (such as a human) has entered an area of concern 106 proximate to the RF radiation source 102, such as a cell tower. The one or more sensors 104 may be located within the area of concern 106, on a border of the area of concern 106, and/or outside the area of concern 106. In some cases, there may be multiple areas of concern 106, which are not necessarily connected or contiguous.

The one or more sensors 104 may include, for example, an artificial intelligence (AI) camera capable of distinguishing a human from other types of objects that enter the area of concern 106. Suitable AI cameras may include, for example, an ICAM-540 industrial AI camera available from Advantech Co., Ltd. of Taoyuan City, Taiwan. Other AI cameras may include, for example, the Avigilon line of cameras available from Motorola Solutions Inc., which may include fish eye cameras, double fish eye cameras, bullet cameras, box cameras, dome cameras, panoramic cameras, pan/tilt/zoom (PTZ) cameras, and the like. In some configurations, an AI camera may be capable of identifying and tracking an individual or multiple individuals using facial recognition, movement/gait tracking, or other techniques. The RFIS system 100 may include a variety of other types of sensors 104, as discussed in greater detail hereafter.

The one or more sensors 104 may be operatively connected (via wired or wireless communication) to an RF mitigation system 108. As used herein, "operatively connected" may include a connection through one or more intermediaries. The RF mitigation system 108 may include, for example, a processor 110, a memory 112, an electrical input 114, an electrical output 116, and a power interrupter (such as a relay 118), disposed on an electrical path 120 between the electrical input 114 and the electrical output 116. The relay 118 may be embodied, for example, as a solid state relay (SSR) available from XiQu Electric Technology Co., Ltd. of Wenzhou, China, which is capable of handling up to 80 amps at 220 volts.

The one or more sensors 104 may be located remotely from the processor 110, as shown in FIG. 1. In other configurations, the one or more sensors 104 (or certain ones of the one or more sensors 104) may be housed within a component (not shown) including the processor 110.

In some configurations, the RF mitigation system 108 may further include a communication interface 124, such as a network interface. The communication interface 124 may implement one or more wired or wireless protocols, non-limiting examples of which include IEEE 802.11x, Wi-Fi, ZigBee, Bluetooth, Bluetooth Low Energy (BLE), Long Range (LoRa) protocol, ESP-Now, Message Queuing Telemetry Transport (MQTT), Global Message Service (GSM), General Packet Radio Service (GPRS), Long Term Evolution (LTE), and/or Z-Wave. In certain implementations, multiple communication interfaces 124 implementing different protocols may be provided for a variety of purposes, such as communicating with sensors 104 or other components of the RFIS system 100, communicating with a remote server, issuing electronic alerts, or the like.

The processor 110 may be any suitable processing device (e.g., CPU) known in the art. The memory 112 may include, without limitation, one or more random access memories (RAMs), read-only memories (ROMs), electrically erasable programmable read-only memories (EEPROMs), secure digital (SD) cards, solid state drives (SSDs), nonvolatile memory express (NVMe) drives, or the like.

The electrical input 114 of the RF mitigation system 108 may be operatively connected to a power supply 126 for the RF radiation source 102. The power supply 126 may be an alternating current (AC) or direct current (DC) power supply, depending on the implementation of the RF radiation source 102. Typically, 5G antennas will use an AC power supply 126, whereas earlier types of antennas will use a DC power supply 126. The electrical output 116 of the RF mitigation system 108 may be operatively connected to the usual power and/or powered signal input for the RF radiation source 102, such that the RF radiation source 102 receives its power (and potentially signal) through the RF mitigation system 108.

The processor 110 may be operatively connected to the relay 118 and the one or more sensors 104. In some embodiments, the processor 110 is configured, at least in response to detection by the one or more sensors 104 that an object (or, more specifically, a human) has entered the area of concern 106, to open the relay 118 to temporarily interrupt power to the RF radiation source 102. The processor 110 may also be configured to close the relay 118 to automatically restore the power to the RF radiation source 102 at least in response to the one or more sensors 104 detecting that the object has exited the area of concern 106.

Accordingly, the RF mitigation system 108 may prevent the RF radiation source 102 from emitting harmful radiation while a human is within the area of concern 106, eliminating the need for permanent signage, which can be unsightly, or barriers, which can be impractical or interfere with network performance.

In some configurations, the power interrupter (e.g., relay 118) may be replaced by a power reducer, such as a resistor or dynamic attenuator, that reduces power to the RF radiation source 102 to reduce RF exposure/emissions to a predetermined level that is less than, for example, the maximum permissible exposure (MPE). The power reducer may be located on a signal path between an RF source and an RF antenna in certain configurations. In some configurations, the power reducer may be configured to reduce power slowly or by degrees, allowing telephone connections to a cell tower, for example, to switch to a different cell tower without being abruptly disconnected.

In still other configurations, the power interrupter (e.g., relay 118) may be disposed on the signal path to cut off a signal to the RF radiation source (e.g., RF antenna). In the case of a 5G antenna, the signal path may be optical fiber, and the relay 118 may be an optical relay.

In certain implementations, the processor 110 may be configured to open the relay 118 after a predetermined or calculated time delay, since RF radiation exposure is dependent upon the time that a human is in the area of concern 106. The delay may be based, for example, on the signal strength of the RF radiation source 102, the power density of RF radiation within the area of concern 106, the accumulated RF radiation exposure of a human within the area of concern 106, or in other ways.

In certain implementations, the communication interface 124 may be configured to send a message to a network operations center (NOC), which supplies an RF signal to the RF radiation source 102. The message may be embodied in any suitable format, such as a short message service (SMS) message, Web Services Notification (WSN), push notification, Transmission Control Protocol/IP Protocol (TCP/IP)

packet, a User Datagram Protocol (UDP) packet. The message may instruct (or request) the NOC to interrupt or reduce the RF signal before it is sent to the RF radiation source 102. The message may be automatically processed by an Application Programming Interface (API) running on a software service for the NOC. Alternatively, the message may be sent to a human operator at the NOC requesting manual intervention. The communication interface 124 may be used to interrupt (or reduce) power to the RF radiation source 102 as an alternative, or in addition, to the relay 118. For example, if the NOC does not respond within a predetermined time period, the relay 118 may be used to interrupt power to the RF radiation source 102.

FIG. 1 illustrates a configuration in which the power supplied by the output 116 of the RF mitigation system 108 to the RF radiation source 102 has not yet been combined with an RF signal to be transmitted. Subsequently, an RF source 122 may combine the RF signal (provided, for example, by a NOC) with the power flowing from the output 116 before it is supplied to the RF radiation source 102 (e.g., RF antenna). The RF mitigation system 108 is considered to be operatively connected to the RF radiation source 102 (via the RF source 122) in this configuration.

Figure 2:
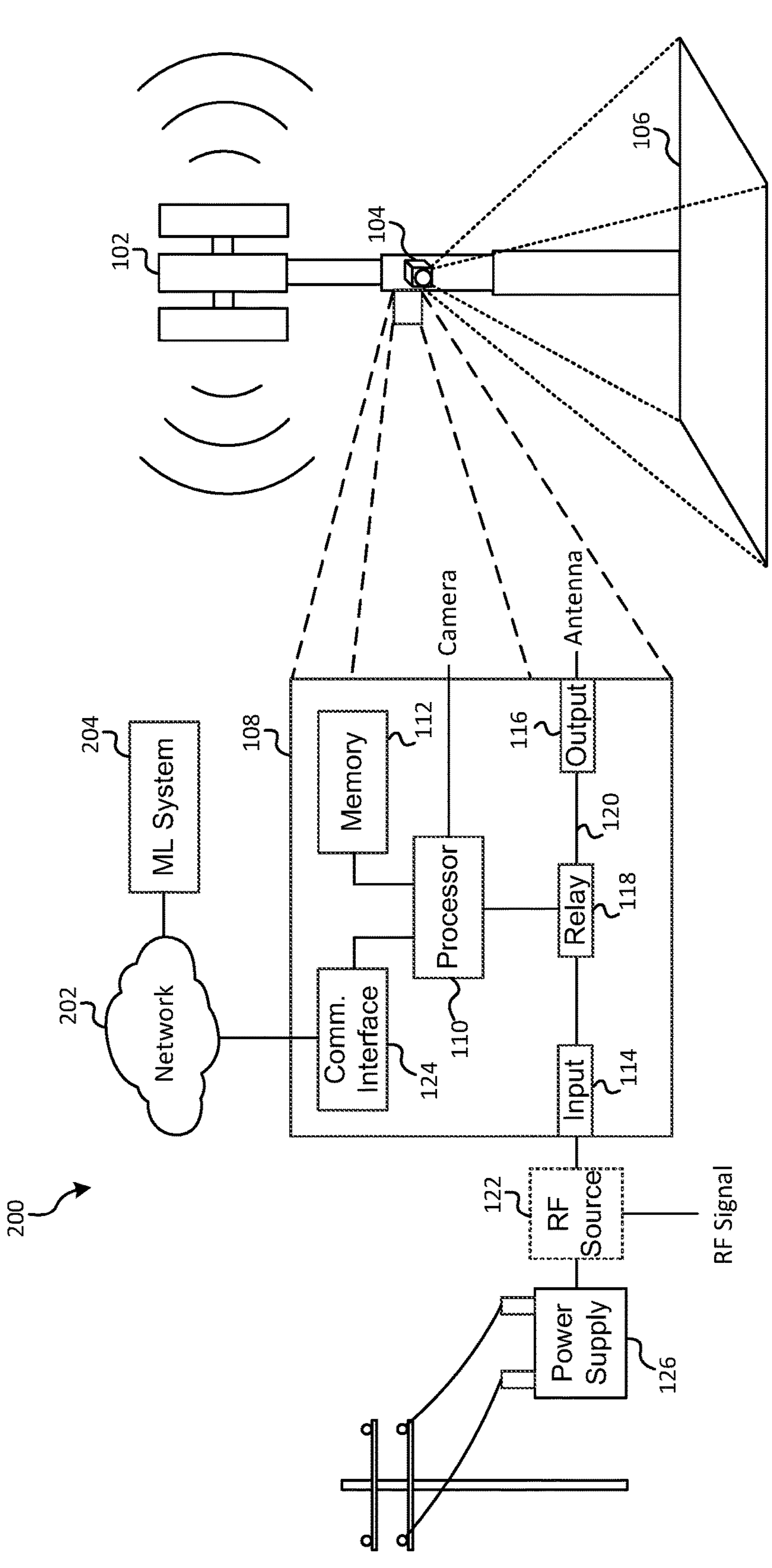
FIG. 2 is a schematic diagram of another configuration of an RFIS system.

FIG. 2 illustrates another configuration of an RFIS system 200, where the RF source 122 is disposed between the power supply 126 and the input 114 of the RF mitigation system 108. The RF source 122 combines the power from the power supply 126 with the RF signal (provided, for example, by the NOC). In this embodiment, the relay 118 interrupts the powered RF signal before it is provided to the RF radiation source 102 (e.g., RF antenna). In this configuration, the input 114 of the RF mitigation system 108 is considered to be operatively connected to the power supply 126 (via the RF source 102). The remainder of this disclosure will not specify whether the RF signal is added to the power before or after the RF mitigation system 108, and the configurations disclosed herein should be construed to include either arrangement.

FIG. 2 also illustrates a configuration where the one or more sensors 104 include a standard digital camera that is not capable of distinguishing humans from other objects. In this implementation, the communication interface 124 may communicate through a network 202, such as, without limitation, a local area network (LAN), a wide area network (WAN), a cellular network, and/or the Internet, with a machine learning (ML) system 204 operating on a remote server. The ML system 204 may include, for example, a neural network, such as a convolutional neural network (CNN) or feedforward neural network (FNN), that has been trained for distinguishing humans from other objects. The processor 110 may send images or video from the digital camera to the ML system 204 via the communication interface 124 and the network 202 and receive therefrom an indication (e.g., binary or probability) of whether the object is a human. Based on the indication, the processor 110 will determine whether to open the relay 118. In some implementations, the processor 110 will open the relay 118 if the ML system 204 (or a similarly configured AI camera as in FIG. 1) reports that the probability of the object being a human is beyond a specified confidence threshold (e.g., 90%). In certain embodiments, whether the processor 110 opens the relay 118 may depend on the RF conditions at the time (e.g., the power density of RF radiation within the area of concern 106 and/or the RF radiation exposure to the object within the area of concern 106), as described in greater detail below.

Figure 3:
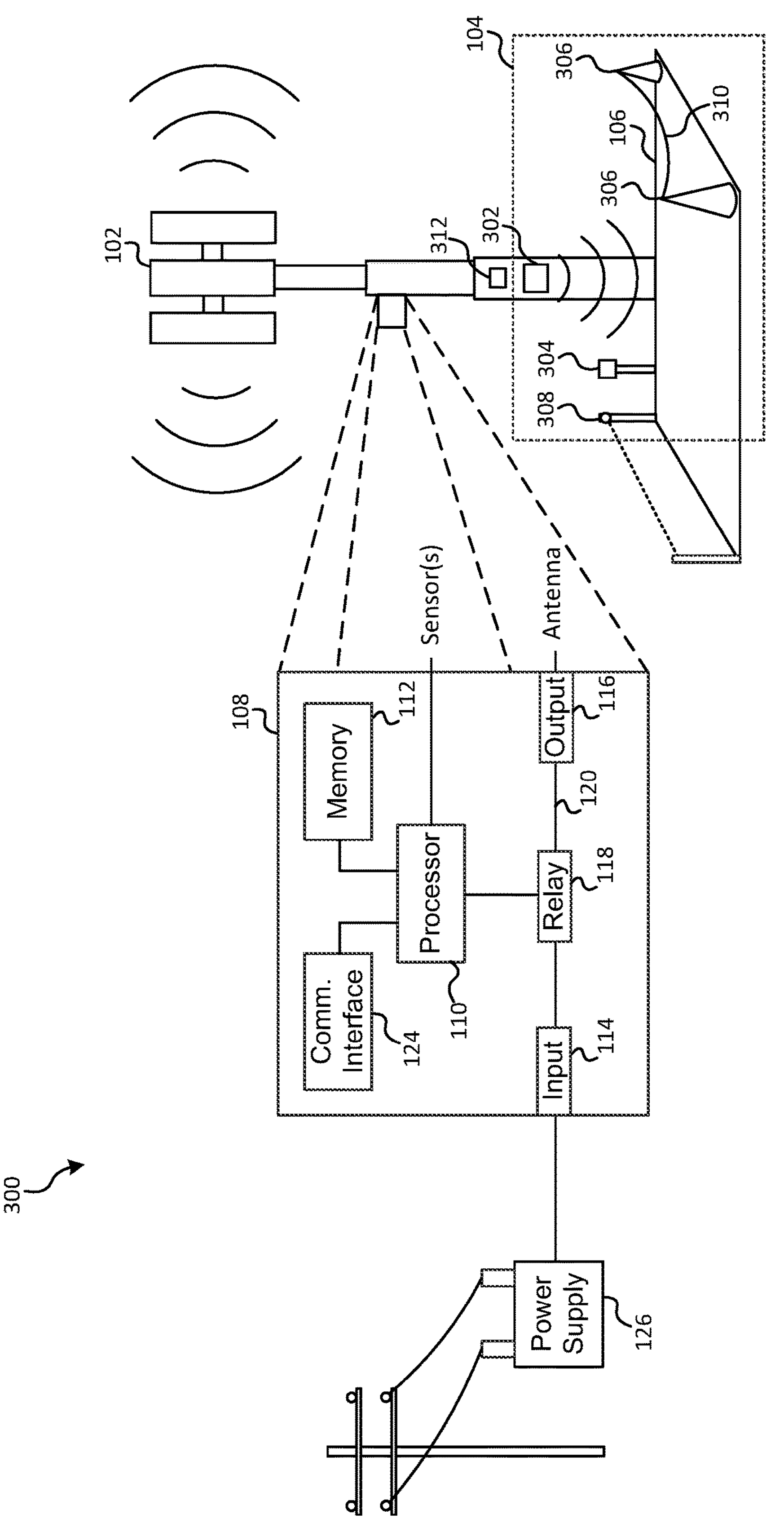
FIG. 3 is a schematic diagram of still another configuration of an RFIS system.

In some configurations, as illustrated in FIG. 3, an RFIS system 300 may include one or more of a variety of sensors 104, such as, without limitation, a motion detector 302 (e.g., IR, ultrasonic, microwave), a proximity detector 304, a barrier tip/move sensor 306, a photoelectric beam sensor 308, a breakaway wire sensor 310, a time-of-flight (TOF) distance sensor 312, and the like. Implementations of barrier tip/move sensor 306 are described in U.S. Pat. No. 10,969,415, for RF RADIATION SOURCE SECTOR MONITORING DEVICE AND METHOD, which is incorporated herein by reference.

In some implementations, one or more of the foregoing sensors 104 may operate in concert with a camera or an AI camera with human-detection capabilities. For example, an object may be detected by a photoelectric beam sensor 308, which is installed outside of the field of view of the camera. Detection of the object by the photoelectric beam sensor 308 may cause the processor 110 to take a first set of actions, such as, for example, issuing a visual or audible warning or digitally projecting a sign, as described in greater detail hereafter. Later, if the object is confirmed to be a human by an AI camera or the like, the processor 110 may perform a second set of actions, such as opening the relay 118, as previously described, or logging the entry, as detailed hereafter. A wide variety of actions may be specified for the processor 110 in response to distinct types of sensor input based on programmed instructions stored in the memory 112 and/or provided via the communication interface 124.

Figure 4:
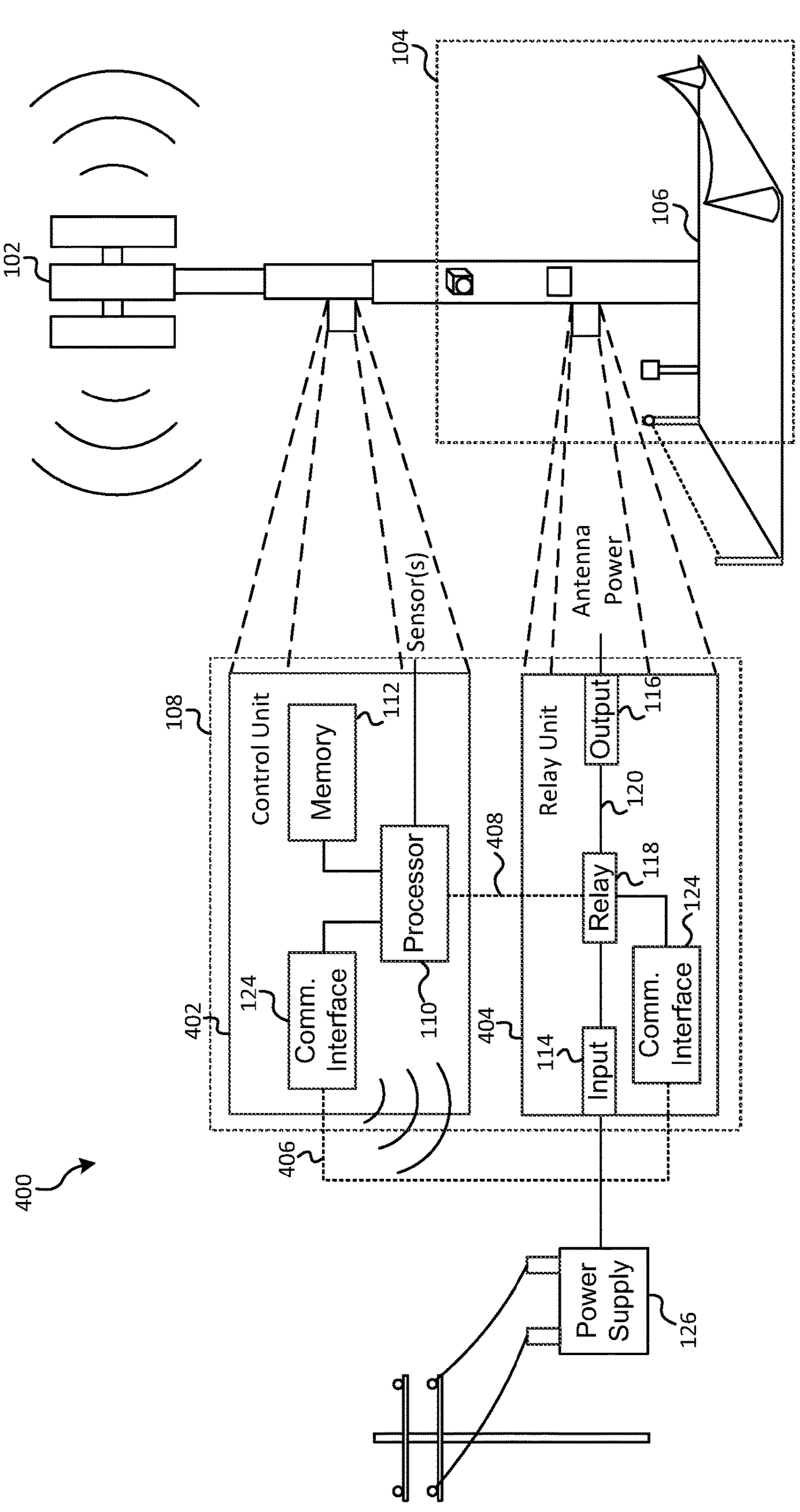
FIG. 4 is a schematic diagram of yet another configuration of an RFIS system.

FIG. 4 illustrates an RFIS system 400 in which the functionality of the RF mitigation system 108 is divided between a control unit 402 and a relay unit 404. The control unit 402 may include, for example, the processor 110, the memory 112, and the communication interface 124, while the relay unit 404 may include the electrical input 114, the electrical output 116, the relay 118, and the electrical path 120. This configuration allows for convenient placement of the control unit 402 and the relay unit 404 at any suitable location on or near the RF radiation source 102 and, in some cases, the power supply 126. In addition, this configuration may allow for multiple relay units 404, each of which may serve a different RF radiation source 102 within a single RFIS system 400.

In some implementations, the relay unit 404 includes a communication interface 124 operatively connected to the communication interface 124 of the control unit 402 via a wired or wireless connection. The processor 110, upon receiving an indication that the one or more sensors 104 have detected an object (or in some configurations, a human) entering the area of concern 106, may send an instruction via the communication interfaces 124 and a wireless connection 406 to open the relay 118 within the relay unit 404. Alternatively, the communication interfaces 124 may use a wired connection. In other configurations, the processor 110 may include a direct (e.g., wired) connection 408 to the relay 118 that does not require the communication interfaces 124.

Figure 5:
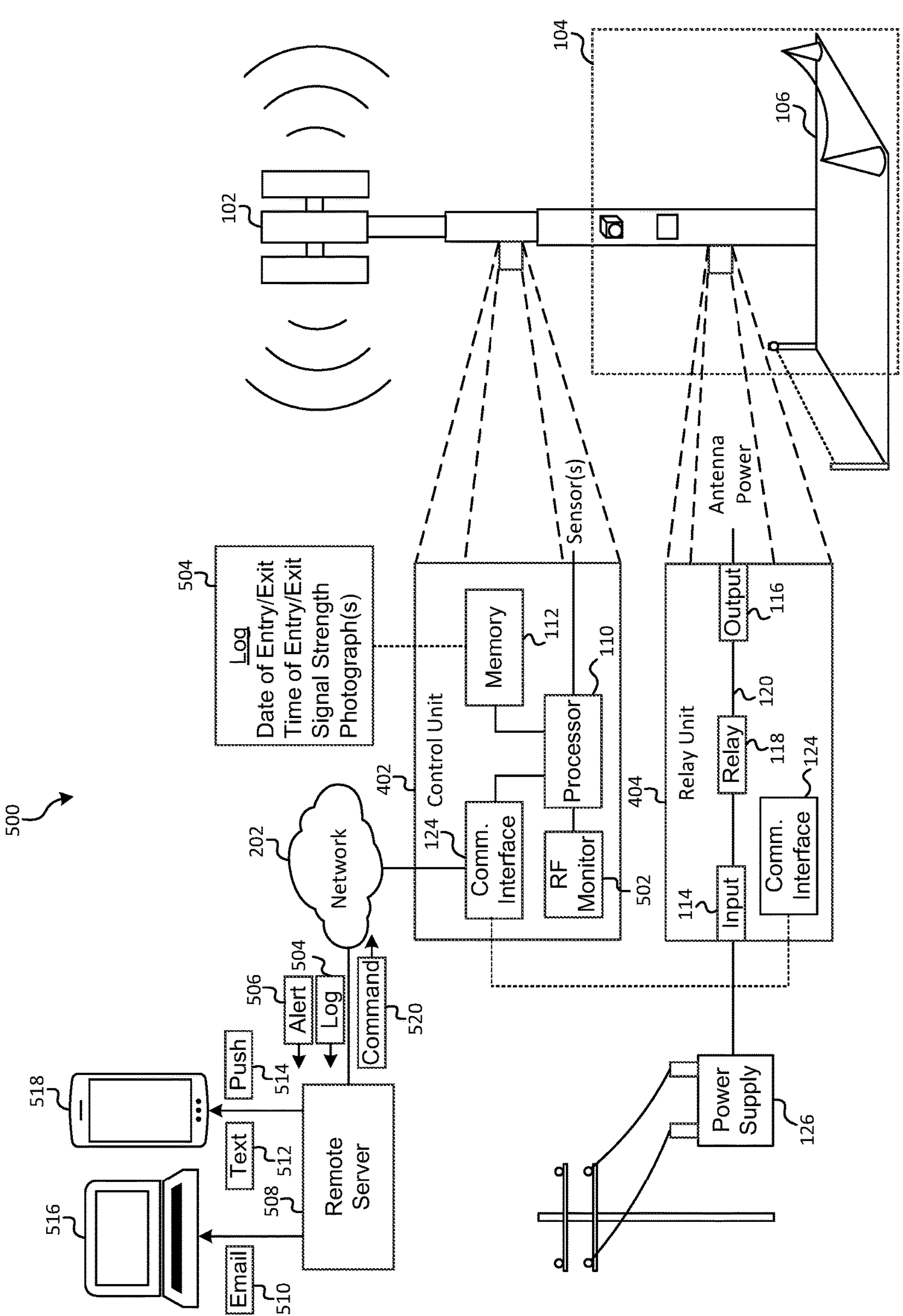
FIG. 5 is a schematic diagram of an additional configuration of an RFIS system.

FIG. 5 illustrates an RFIS system 500 in which the control unit 402 includes or is operatively connected with an RF monitor 502 configured to monitor the signal strength of the RF radiation source 102, the power density of RF radiation within the area of concern and/or RF radiation exposure to the object in the area of concern 106. RF radiation exposure may be determined by a variety of factors, including signal strength, signal frequency, and time of exposure. Thus, the RF monitor 502 may be configured, in some embodiments, to estimate the RF radiation exposure to a human that has entered the area of concern 106, which will increase over time as long as the human is within the area of concern 106.

An example of RF monitor 502 is described in U.S. Pat. No. 10,969,415, for RF RADIATION SOURCE SECTOR MONITORING DEVICE AND METHOD, which is incorporated herein by reference. The RF monitor 502 may have, for example, a scanning bandwidth of 5 MHz with sampling rates between 4.3 μs to 2.86 μs and an RF detection threshold of −90 dBm.

In some implementations, the RF monitor 502 may include a RF meter that can measure the power of an entire frequency range from, for example, 600 MHz to 70 GHz, including all carrier waves, harmonics, and intermodulation products. In other configurations, the RF monitor 502 may monitor signal strength for discrete frequency bands. Certain bands are more hazardous to humans at high power levels than others. For example, the frequency range of 30-300 MHz, where whole-body absorption of RF energy by human beings is most efficient, is of particular concern. At other frequencies whole-body absorption is less efficient, and, consequently, may be less of a concern for purposes of interrupting power to the RF radiation source 102 when a human is detected.

In still other configurations, the RF monitor 502 will determine RF radiation exposure within the area of concern 106 for a human, generally, or for one or more specific humans that have entered the area of concern 106. The OET Bulletin 65 of the FCC provides guidelines for human exposure to radiofrequency electromagnetic fields. Maximum permissible exposure (MPE) limits are defined in terms of power density (units of milliwatts per centimeter squared: $mW/cm^2$), electric field strength (units of volts per meter: V/m) and magnetic field strength (units of amperes per meter: A/m). In the far-field of a transmitting antenna, where the electric field vector (E), the magnetic field vector (H), and the direction of propagation can be considered to be all mutually orthogonal ("plane-wave" conditions), these quantities are related by the following equation:

$$S = \frac{E^2}{3770} = 37.7H^2 \quad \text{Eq. (1)}$$

where S=power density ($mW/cm^2$), E=electrical field strength (V/m), and H=magnetic field strength (A/m).

An aspect of the exposure guidelines is that they apply to power densities or the squares of the electric and magnetic field strengths that are spatially averaged over the body dimensions. Spatially averaged RF field levels most accurately relate to estimating the whole body averaged specific absorption rate (SAR) that will result from the exposure and the MPEs specified in the OET Bulletin 65. A whole-body average SAR of 0.4 W/kg has been specified as the restriction that provides adequate protection for occupational exposure. Local values of exposures that exceed the stated MPEs may not be related to non-compliance if the spatial average of RF fields over the body does not exceed the MPEs. Another feature of the exposure guidelines is that exposures, in terms of power density, $E^2$ or $H^2$, may be averaged over certain periods of time with the average not to exceed the limit for continuous exposure.

As an illustration of the application of time-averaging to occupational/controlled exposure consider the following. The relevant interval for time-averaging for occupational/controlled exposures is six minutes. This means, for example, that during any given six-minute period a worker could be exposed to two times the applicable power density limit for three minutes as long as he or she were not exposed at all for the preceding or following three minutes. Similarly, a worker could be exposed at three times the limit for two minutes as long as no exposure occurs during the preceding or subsequent four minutes, and so forth.

This concept can be generalized by considering Equation (2) that allows calculation of the allowable time(s) for exposure at [a] given power density level(s) during the appropriate time-averaging interval to meet the exposure criteria of the OET Bulletin 65. The sum of the products of the exposure levels and the allowed times for exposure must equal the product of the appropriate MPE limit and the appropriate time-averaging interval.

$$\sum S_{exp} t_{exp} = S_{limit} t_{avg} \quad \text{Eq. (2)}$$

where $S_{exp}$=power density level of exposure ($mW/cm^2$), $S_{limit}$=appropriate power density MPE limit ($mW/cm^2$) (e.g., as specified in OET Bulletin 65), $t_{exp}$=allowable time of exposure for $S_{exp}$, and $t_{avg}$=appropriate MPE averaging time.

The RF monitor 502 may output an indication of the power density of RF radiation with the area of concern and/or calculated RF radiation exposure within the area of concern 106 to the processor 110. In some embodiments, the RF monitor 502 is capable of tracking individual RF radiation exposure for one or more humans (individually identified, for example, by an AI camera) based on the length of time each human is within the area of concern 106. In other embodiments, a determination is made for radiation exposure to the object (based, for example, on power density levels) that has been detected in the area of concern 106.

As the RF monitor 502 may be positioned in a location outside of the area of concern, it may need to be calibrated via, for example, time-synchronized measurements between, for example, power density measured at the RF monitor 502 and power density at one or more given locations within the area of concern 106. For example, if the power density is at the RF monitor 502 is X, the power density at a given location within the area of concern 106 may be X*Y. Based on the time-synchronized measurements, a 3D variation map between the measured power density at the RF monitor and a volume within the area of concern 106 may be calculated, allowing for the power density at any given location within the area of concern 106 to be calculated or estimated, which may change as the object (e.g., human) moves. An overall RF radiation exposure for the object after entering the area of concern 106 may then be calculated over time.

In some implementations, the processor 110 will cause the relay 118 to open if (1) the one or more sensors 104 have detect that an object (e.g., human) has entered the area of concern 106, and (2) power density of RF radiation within the area of concern and/or the RF radiation exposure to the object within the area of concern has exceeded the predetermined threshold (e.g., MPE) based, for example, on the signal frequency, power density, time of exposure, and the like. In other words, the processor 110 need not open the relay 118 simply in response to the object being detected if the power density of the RF radiation source 102 or the RF radiation exposure for the object is below the predetermined threshold. As described in greater detail hereafter, the power density of the RF radiation and/or the RF radiation exposure, as reported by the RF monitor 502, may be used to determine whether to issue various warnings (e.g., visual or audible) or electronic alerts and/or to take other action, such as logging the entry of the object into the area of concern 106.

In some implementations, the memory 112 of the control unit 402 may be used to store a log 504 of certain events, such as the entry of the object (or human) into the area of concern 106. This may include, without limitation, the date of entry (i.e., the date the object entered the area of concern 106), the time of entry, the RF radiation conditions (e.g., signal strength, power density, and/or RF radiation exposure at the time of entry as reported by the RF monitor 502), a photograph (or video) of the object entering the area of concern 106 (if the one or more sensors 104 include a camera). In some configurations, video might not be captured for privacy reasons. The log 504 may be further used to store the date that the object exited the area of concern 106, the time of exit, a photograph (or video) of the object exiting the area of concern 106, who was notified of the entry (as well as when and how the notification took place), what alerts (visual or audible) were generated, and/or the like. The log 504 may be used in reviewing an incident of unauthorized entry into area of concern 106, in preparing a report to or responding to an audit by regulatory authorities, or the like.

In some configurations, events are stored in the log 504 only if the object is determined to be a human and/or only if the RF monitor 502 reports a power density for the area of concern an RF radiation exposure for the object that is greater than the predetermined threshold. This may prevent, for example, non-human objects such as animals, being logged when entering the area of concern 106. In some implementations, however, every object that enters the area of concern 106 may be logged, but certain actions may not be taken unless the object is determined to be a human, such as opening the relay 118, issuing certain alerts, and/or the like.

In various configurations, when the entry of an object is detected in the area of concern 106 (and, in some implementations, if the power density of RF radiation within the area of concern 106 and/or the RF radiation exposure for the object within the area of concern 106 exceeds a predetermined threshold) the processor 110 may send an electronic alert 506 via the communication interface 124 and the network 202 to a remote server 508. The electronic alert 506 may be embodied in any suitable format, such as a text message using, e.g., the Short Message Service (SMS), the Rapid Message Service (RMS), or the Rich Communication Service (RCS), an email messages using, e.g., the Simple Mail Transfer Protocol (SMTP), the Internet Message Access Protocol (IMAP), and/or the Post Office Protocol (POP), a push notification using, e.g., the Push Protocol, a Web Services Notification (WSN) or any of a number of packets, such as, without limitation, TCP/IP packets, UDP packets, or Internet Group Management Protocol (IGMP) packets. The electronic alert 506 may include any of the information stored in the log 504 related to a current event involving entry of a particular object into the area of concern 106. In some configurations, the processor 110 may send the log 504 to the remote server 508, either periodically or on demand, for reporting or auditing purposes.

The remote server 508 may then forward the electronic alert 506 (or generate one or more new electronic alerts in the form of an email 510, a text message 512, and/or a push notification 514) to a user device, non-limiting examples of which may include a computer terminal 516 or a smartphone 518. Logs 504 may also be sent via the remote server 508 to the user device in a similar fashion. The email 510, text message 512, and/or push notification 514 may be sent using any suitable protocol or network infrastructure as known to those of skill in the art.

In some embodiments, the user may send a command 520 via the remote server 508 and/or user devices (e.g., the computer terminal 516 or the smartphone 518) to the control unit 402. For example, after reviewing a photograph (or video) of the object entering area of concern 106, the user may determine that the object is not a human, whether or not it is recognized as such by, for example, an AI camera. In such a case, the user may send an "override" command 520 to cause the processor 110 to close the relay 118 and restore the power to the RF radiation source 102 if such were temporarily interrupted. In some embodiments, override commands may not be facilitated, however, for security reasons. Furthermore, in some configurations, the control unit 402 only initiates communication with the remote server 508, but does not receive incoming communications.

The user may send other commands 520 that may control how the processor 110 responds to different types of input from the one or more sensors 104, e.g., the predetermined threshold for power density or RF radiation exposure needed to interrupt power to the RF radiation source 102 if an object (or human) breaches the area of concern 106, whether (and under what circumstances) to present audible or visual warnings (as described in greater detail hereafter), how often the processor 110 sends updates (e.g., log 504), and/or whether (and under what conductions) to send electronic alerts 506 and to whom and with what parameters.

Figure 6:
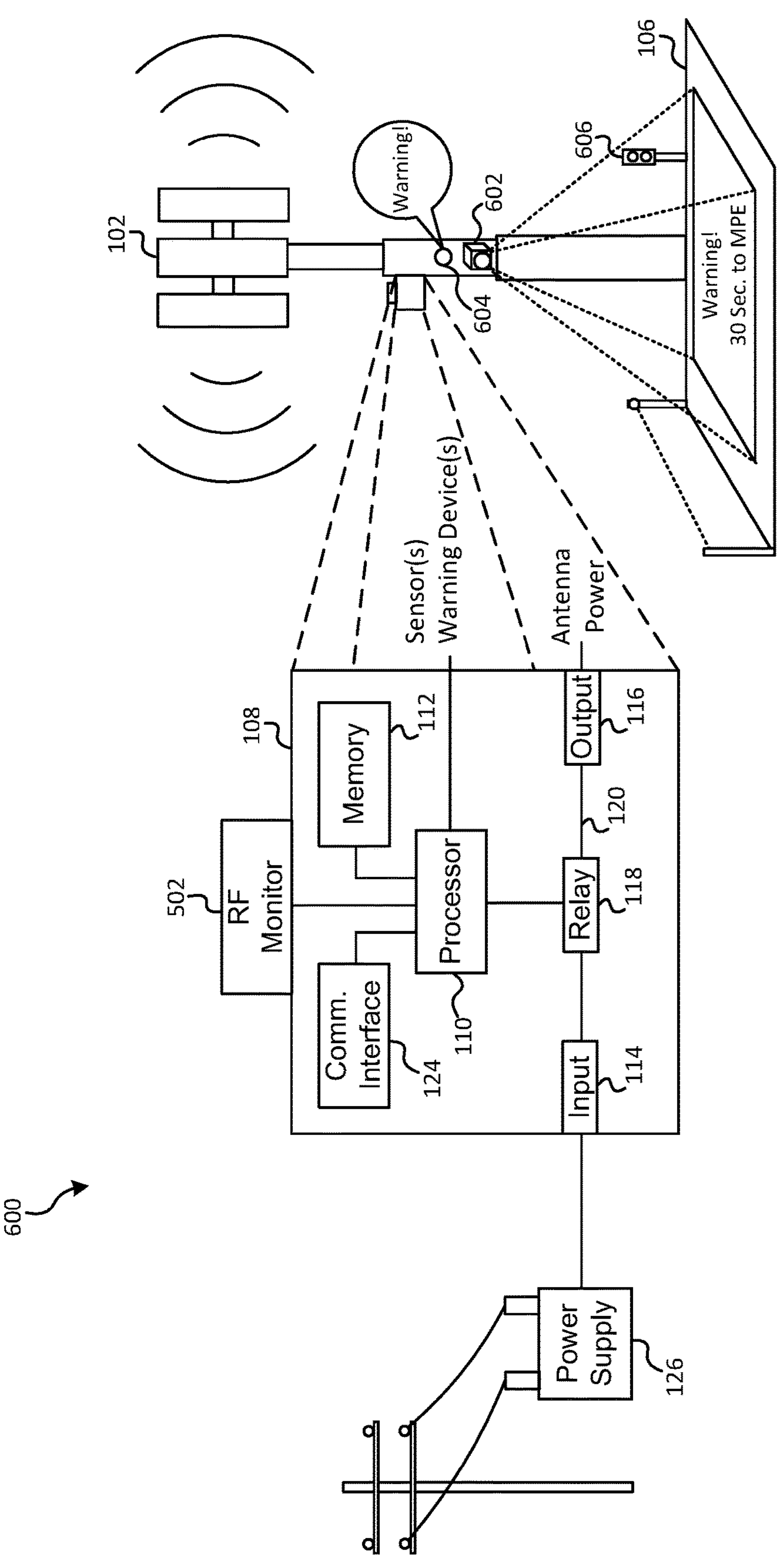
FIG. 6 is a schematic diagram of a further configuration of an RFIS system.

FIG. 6 illustrates a configuration of an RFIS system 600 in which the RF monitor 502 and RF mitigation system 108 are embodied as separate components. In addition, the processor 110 may be operatively connected (via a wired or wireless connection) to one or more warning devices, such as, for example, a warning sign projector 602, a warning sound emitter 604, and a warning light 606. The one or more warning devices may be activated, for example, if a human enters the area of concern 106 when the power density within the area of concern 106 (or RF radiation exposure to the object within the area of concern 106) exceeds a predetermined threshold.

The warning sign projector 602 may be embodied as a digital sign projector that projects a warning sign onto a surface in or proximate to the area of concern 106. The warning sign projector 602 may use lasers or high-contrast and high-intensity light emitting diodes (LEDs) for projection. A suitable warning sign projector 602 may include, for example, a SAFETYCAST™ 300 Sign Projector available from Laserglow Technologies Industrial Safety of Toronto, Ontario, Canada. The surface onto which the warning sign is projected may include the floor, a wall, HVAC equipment or other machinery, the RF radiation source 102, itself, and/or the like.

In some implementations, the warning sign may indicate a telephone number or other contact information for an operator of the RF radiation source 102. In certain implementations, the warning sign may include dynamic information, such as a countdown, which may serve as an indication to a worker of the amount of time remaining until the maximum permitted exposure (MPE).

The warning sound emitter 604 may include a loudspeaker, i.e., an electroacoustic transducer that converts an electrical audio signal into a corresponding sound. The warning sound emitter 604 may be an electronic siren, which incorporate circuits such as oscillators, modulators, and amplifiers to synthesize a selected siren tone (wail, yelp, pierce/priority/phaser, hi-lo, scan, airhorn, etc.), which is played through external speakers. Alternatively, the warning sound emitter 604 may utilize sampled audio (such as spoken words) and/or text-to-speech technology to verbally warn a person of the danger of RF radiation within the area of concern 106. In still other configurations, the warning sound emitter 604 may be a pneumatic siren (e.g., aerophone).

The warning light 606 may include one or more light-emitting devices, such as LEDs, which may be color-coded to indicate whether the area of concern 106 is safe or unsafe. For example, the warning light 606 may include a red LED to indicate that the area of concern 106 is currently unsafe because the power density within the area of concern 106 (or the RF radiation exposure within the area of concern 106) exceeds a predetermined threshold. In some embodiments, the warning light 606 may include LEDs of multiple colors. For example, a green LED may be included to indicate that the area of concern 106 is currently safe. An orange or yellow LED may be used to indicate that the area of concern 106 is safe for exposures shorter than a predetermined time period.

Multiple warning devices may be used simultaneously, including the warning sign projector 602, the warning sound emitter 604, and the warning light 606. The processor 110 may be programmed via instructions in the memory and/or by commands sent via the communication interface 124, which may include the threshold power density (or RF radiation exposure) to trigger a warning, which device(s) should be used in connection with a warning, etc.

Figure 7A:
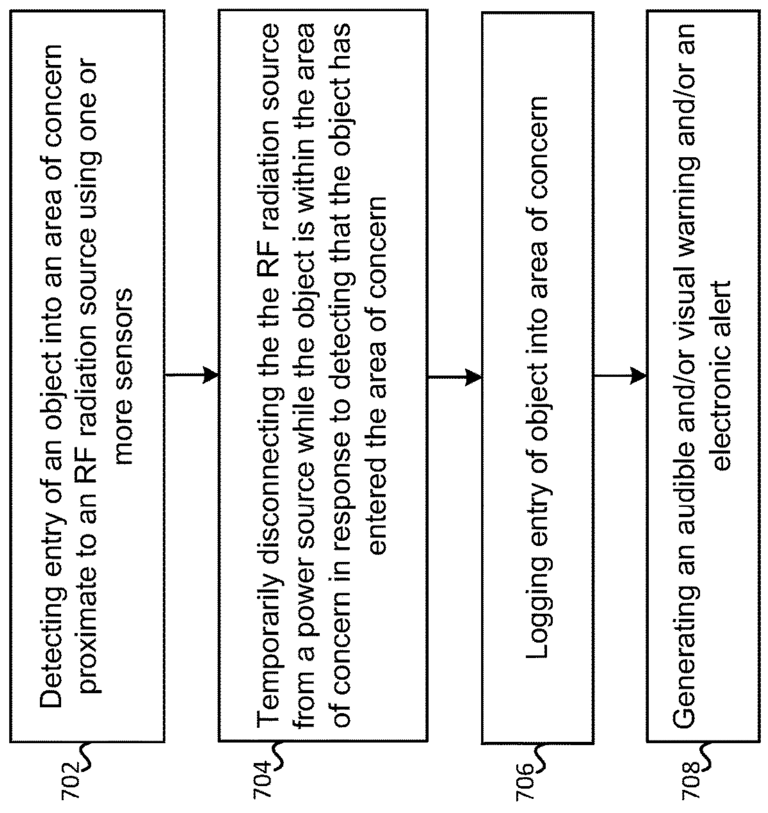
FIGS. 7A, 7B, 7C, 7D, 7E, and 8 are flowcharts of methods for mitigating RF radiation exposure proximate to an RF radiation source.

FIG. 7A is a flowchart of a method 700 for mitigating RF radiation exposure in an area of concern proximate to an RF radiation source. At step 702, the method 700 may include detecting entry of an object into an area of concern proximate to an RF radiation source using one or more sensors. The area of concern may be a region proximate to the RF radiation source where a power density within the area of concern exceeds a predetermined threshold or RF radiation exposure for the object exceeds a maximum permissible exposure (MPE) when the RF radiation source is in operation. The one or more sensors may include an AI camera, which is capable of distinguishing a human from other types of objects. Alternatively, or in addition, the one or more sensors may include, without limitation, a camera that is not AI-enabled, a proximity sensor, a motion detector, a barrier tip/lift sensor, and/or a photoelectric beam sensor.

At step 704, the method 700 may also include temporarily disconnecting the RF radiation source from a power source while the object is within the area of concern. In response to detecting that the object has entered the area of concern. The disconnection may be performed by an RF mitigation system, which may include, for example, a processor, an electrical input, an electrical output, and relay disposed on an electrical path between the electrical input and the electrical output. The processor may be configured to open the relay at least in response to the one or more sensors detecting that the object is within the area of concern.

At step 706, the method 700 may further include logging entry of the object into the area of concern. Logging the entry may include logging one or more of the date of entry (i.e., the date the object entered the area of concern), the time of entry, the power density or RF radiation exposure at the time of entry, a photograph (or video) of the object entering the area of concern (if the one or more sensors include a camera), the date of exit, a time of exit, and/or a photograph (or video) of the object exiting the area of concern. Logging may include storing the foregoing in a memory for later retrieval, as described in connection with FIG. 5.

At step 708, the method 700 may additionally include generating an audible and/or visual warning and/or an electronic alert. This may be accomplished, for example, using a warning sound emitter, a warning sign projector, and/or a warning light, as described in connection with FIG. 6. The electronic alert may include, for example, an email, a text, or a push notification. In some configurations, the audible and/or visual warning and/or the electronic alert may be generated only if the object is determined to be a human by the one or more sensors.

Figure 7B:
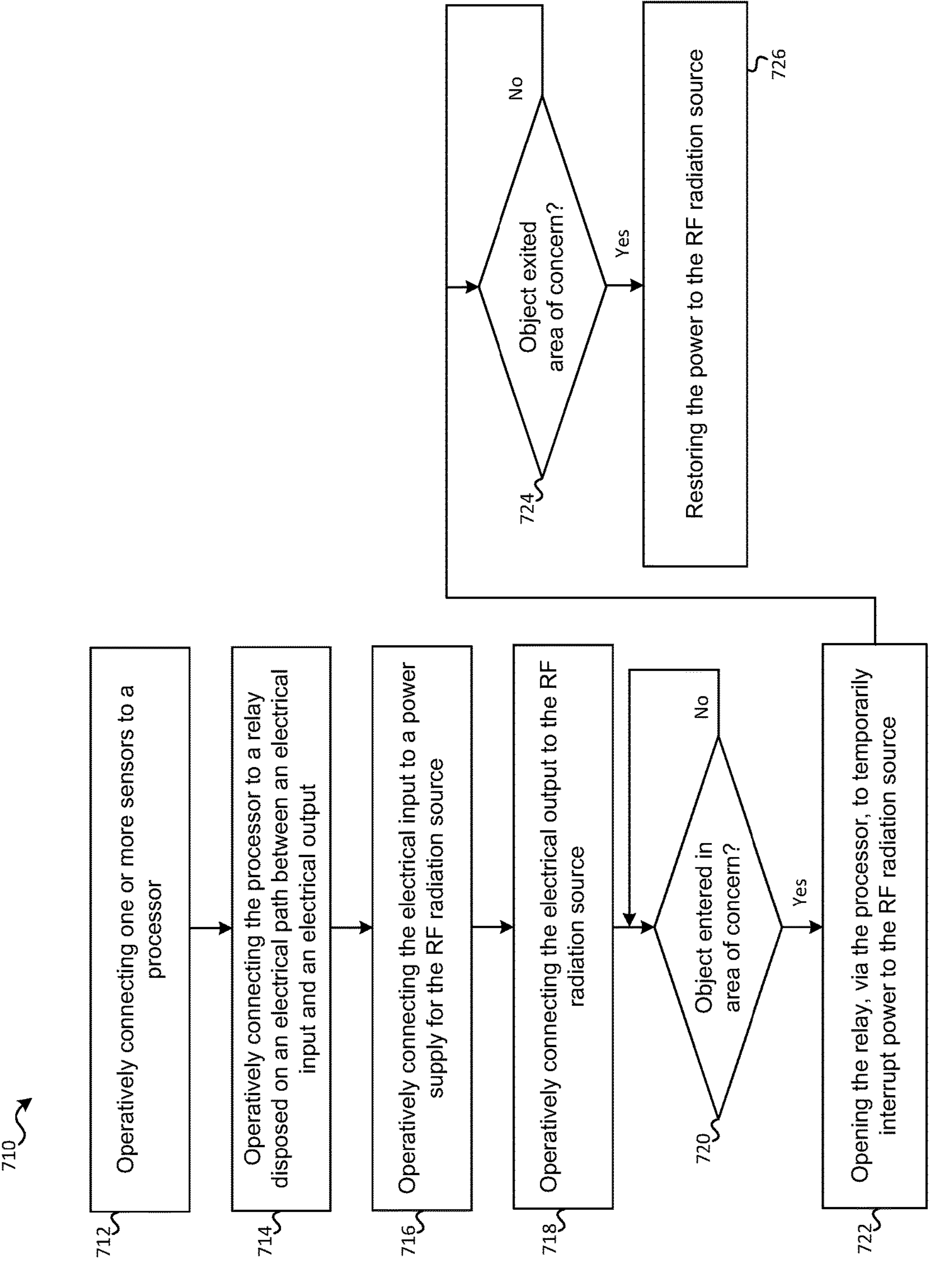

FIG. 7B is a flowchart of another method 710 for mitigating RF radiation exposure in an area of concern proximate to an RF radiation source. At step 712, the method 710 may include operatively connecting one or more sensors to a processor. The one or more sensors may be configured to detect that an object, such as a human, has entered an area of concern proximate to an RF radiation source, such as an RF antenna. The one or more sensors may be located within the area of concern, on a border of the area of concern, or outside the area of concern. In some configurations, the one or more sensors may be part of a single component including the processor. In other configurations, certain sensors of the one or more sensors may be located remotely from the processor.

At step 714, the method 710 may include operatively connecting the processor to a relay disposed on an electrical path between an electrical input and an electrical output. The relay may be configured to selectively connect or disconnect the electrical input and the electrical output through the electrical path under control of the processor. The processor, relay, electrical input, electrical output, and/or electrical path may be components of an RF mitigation system, as illustrated in FIG. 1. In some configurations, however, the processor may be part of a control unit, whereas the relay, electrical input, electrical output, and/or electrical path may be components of a separate relay unit, which may be remote from the control unit, as illustrated in FIG. 3.

At step 716, the method 710 may also include operatively connecting the electrical input to a power supply for the RF radiation source. In addition, at step 718, the method 710 may further include operatively connecting the electrical output the RF radiation source, such that the RF radiation source receives its power via the electrical output.

At step 720, a determination is made, via the one or more sensors, whether an object has entered the area of concern. This may include, as discussed in connection with FIG. 1, determining whether the object is a human using an AI camera. If the object is found to have entered the area of concern, the method 710 may continue, at step 722, by opening the relay, via the processor, to temporarily interrupt power to the RF radiation source. If the object is not detected, the method 710 may return to step 720 to wait for an object entering the area of concern.

At step 724, a determination is made, via the one or more sensors, whether the object has exited the area of concern. If the object is found to have exited the area of concern, the method 710 may continue, at step 726, by restoring the power to the RF radiation source.

Figure 7C:
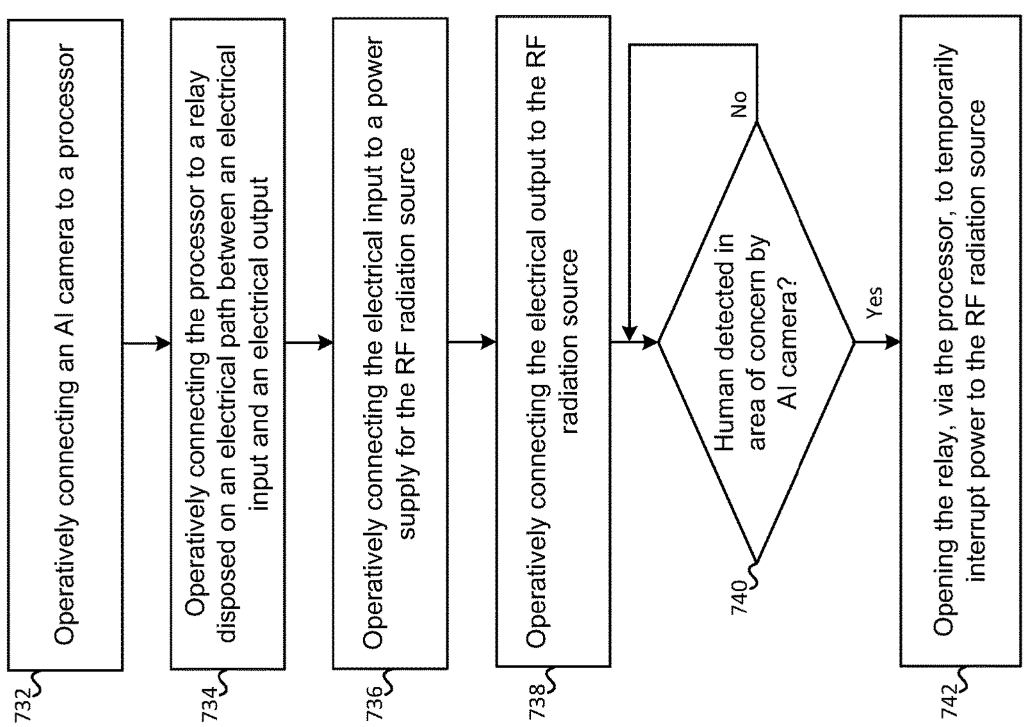

FIG. 7C is a flowchart of yet another method 730 for mitigating RF radiation exposure in an area of concern proximate to an RF radiation source. At step 732, the method 730 may include operatively connecting an AI camera to a processor. At step 734, the method 730 may further include operatively connecting the processor to a relay disposed on an electrical path between an electrical input and an electrical output. The relay may be configured to selectively connect or disconnect the electrical input and the electrical output through the electrical path under control of the processor.

At step 736, the method 730 may also include operatively connecting the electrical input to a power supply for the RF radiation source. In addition, at step 738, the method 730 may further include operatively connecting the electrical output the RF radiation source, such that the RF radiation source receives its power via the electrical output.

At step 740, a determination is made whether a human is detected within the area of concern. If so, the method 730 may proceed with step 742 by opening the relay, via the processor, to temporarily interrupt power to the RF radiation source. If the object is not detected, the method 730 may return to step 740 to wait for a human to enter the area of concern.

Figure 7D:
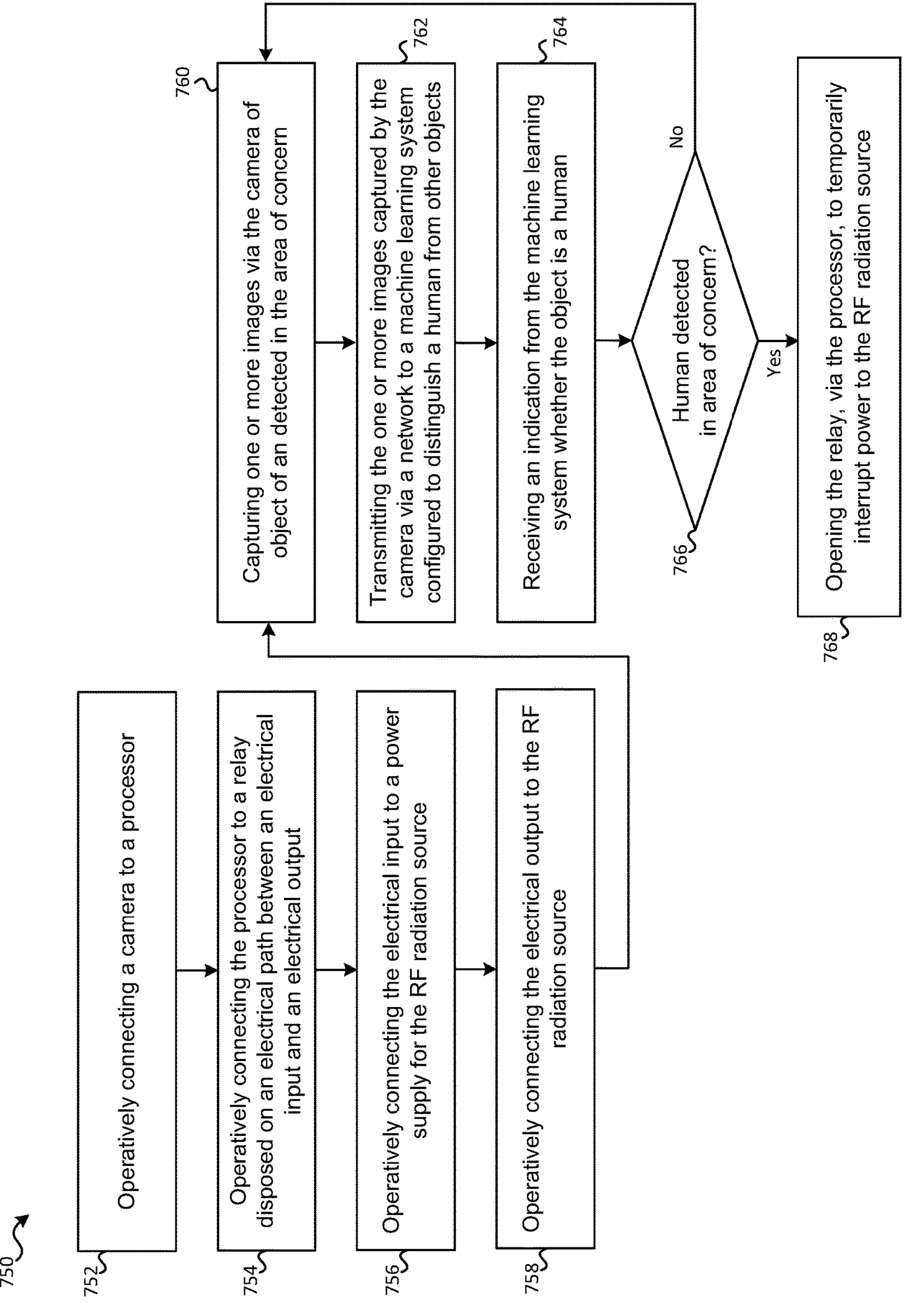

FIG. 7D is a flowchart of yet another method 750 for mitigating RF radiation exposure in an area of concern proximate to an RF radiation source. At step 752, the method 750 may include operatively a camera to a processor. The camera may not be AI-enabled, meaning that the camera cannot distinguish between humans and other objects. In some embodiments, the camera may be AI-enabled to distinguish humans from other objects, but a greater precision for human detection is desired than can be provided by the AI-enabled camera.

At step 754, the method 750 may include operatively connecting the processor to a relay disposed on an electrical path between an electrical input and an electrical output. The relay may be configured to selectively connect or disconnect the electrical input and the electrical output through the electrical path under control of the processor.

At step 756, the method 750 may also include operatively connecting the electrical input to a power supply for the RF radiation source. In addition, at step 758, the method 750 may further include operatively connecting the electrical output the RF radiation source, such that the RF radiation source receives its power via the electrical output.

At step 760, the method 750 may include capturing one or more images (or video) via the camera. At step 762, the method 750 may include transmitting the one or more images (or video) to the camera via a network to a machine learning system configured to distinguish a human from other objects. In some configurations, the machine learning system may be a trained neural network, although other types of recognizers and/or classifiers may be used.

At step 764, the method 750 may include receiving an indication from the machine learning system (via the network) whether the object is a human. The indication may be binary (e.g., yes/no) or a probability (e.g., 95% likelihood of being a human). At step 766, a determination may be made whether a human is detected in the area of concern. Where the indication is a probability, the probability returned by the machine learning system may be compared with a predetermined threshold (e.g., 90%). If the probability is greater than the predetermined threshold, a human may be deemed to have been detected.

If a human is detected in the area of concern, the method 750 may include 768 opening the relay, via the processor, to temporarily interrupt power to the RF radiation source. If, however, a human is not detected in the area of concern, the method 750 may return to step 760 to capture additional images (or video) by the camera.

Figure 7E:
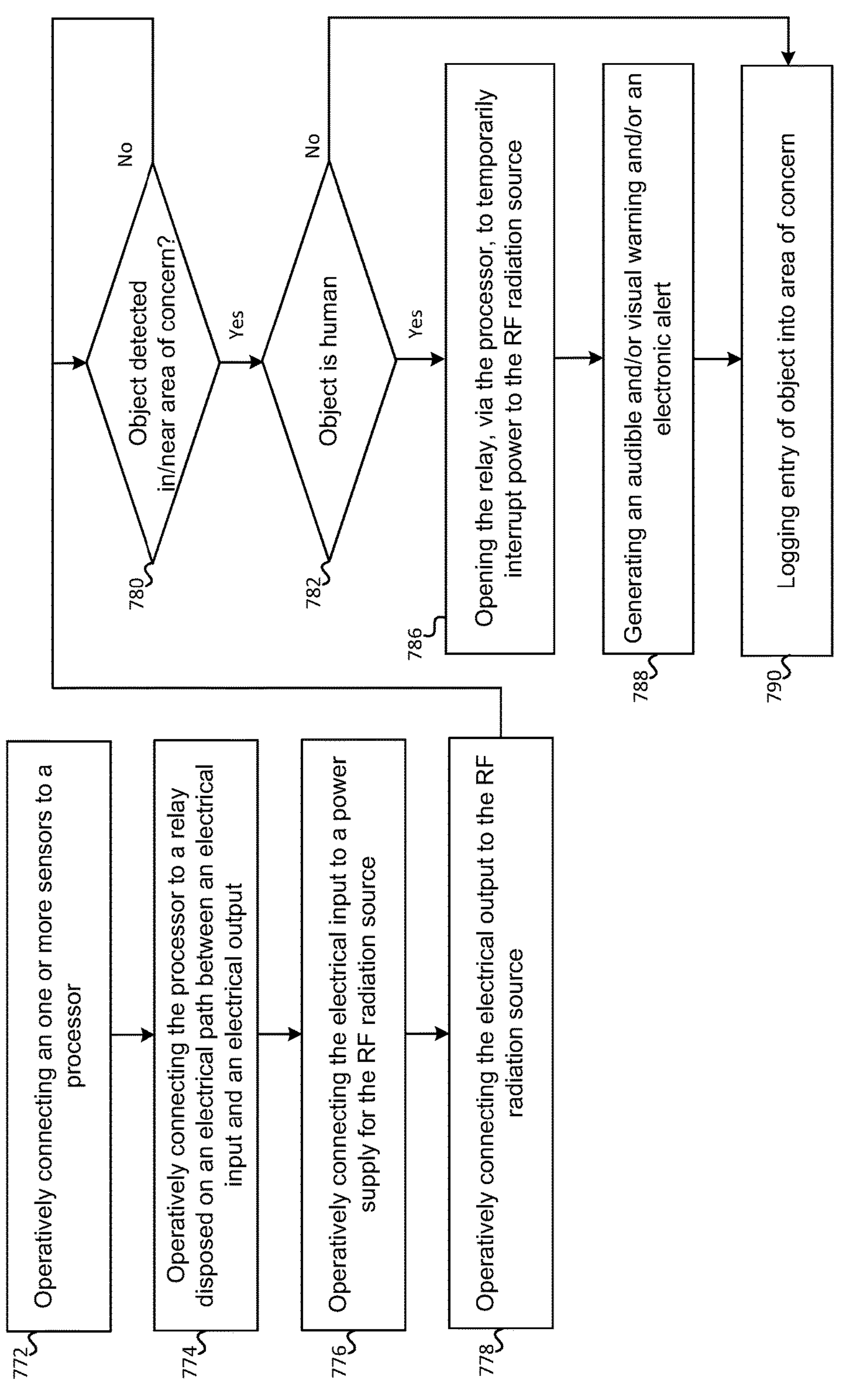

FIG. 7E is a flowchart of yet another method 770 for mitigating RF radiation exposure in an area of concern proximate to an RF radiation source. At step 772, the method 770 may include operatively connecting one or more sensors to a processor. The one or more sensors may include, for example, an AI camera, a motion detector, a proximity sensor, a photoelectric beam sensor, and/or the like. At step 774, the method 770 may include operatively connecting the processor to a relay disposed on an electrical path between an electrical input and an electrical output.

At step 776, the method 770 may also include operatively connecting the electrical input to a power supply for the RF radiation source. In addition, at step 778, the method 770 may further include operatively connecting the electrical output the RF radiation source, such that the RF radiation source receives its power via the electrical output.

At step 780, a determination may be made whether an object is detected in or near the area of concern. If not, the method 770 may stay at step 780 until an object is detected in the area of concern. If an object is detected in the area of concern, the method 770 may proceed to step 782, where a determination may be made whether the object is a human. Steps 780 and 782 may be performed by the same sensor or different sensors at the same time or at different times. For example, a photoelectric beam sensor may determine that an object has entered the area of concern at time T1, whereas an AI-camera may determine that the object is a human at time T2. In some cases, the photoelectric beam sensor may be located outside the area of concern, whereas the AI camera may be located within the area of concern.

If the object is human, the method 770 may continue at step 786 by opening the relay, via the processor, to temporarily interrupt power to the RF radiation source. In addition, the method 770 may continue at step 788 by generating an audible and/or visual warning and/or an electronic alert. In addition, the method 770 may continue at step 790 by logging entry of the object (human) into the area of concern. If the object is not human, however, the method 770 may bypass steps 786 and 788 to proceed with logging entry of the object into the area of concern at step 790.

Figure 8:
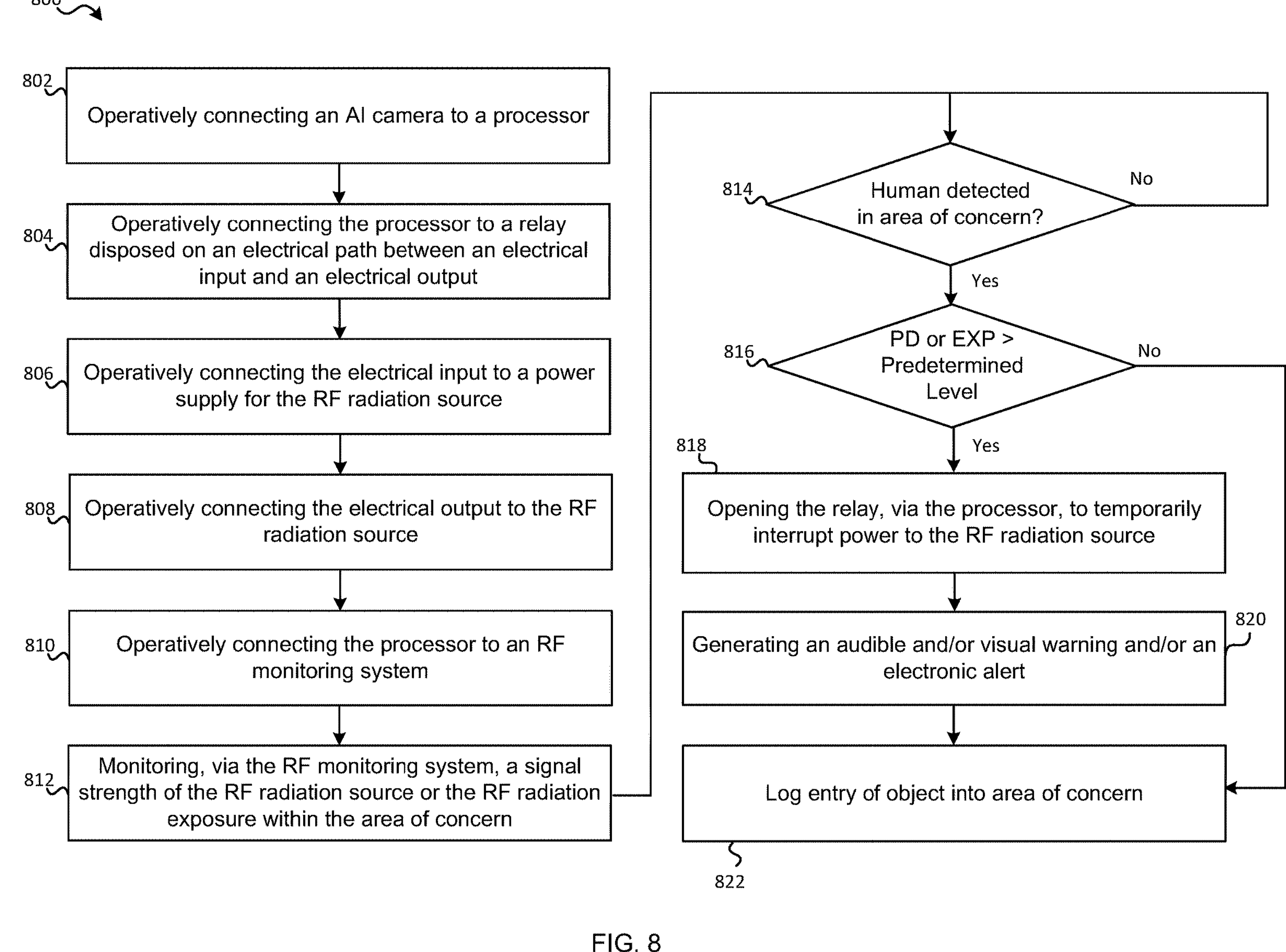

FIG. 8 a flowchart of another method 800 for mitigating RF radiation exposure. At step 802, the method 800 may include operatively connecting an AI camera to a processor. At step 804, the method 800 may further include operatively connecting the processor to a relay disposed on an electrical path between an electrical input and an electrical output. The relay may be configured to selectively connect or disconnect the electrical input and the electrical output through the electrical path under control of the processor.

At step 806, the method 800 may also include operatively connecting the electrical input to a power supply for the RF radiation source. In addition, at step 808, the method 800 may further include operatively connecting the electrical output the RF radiation source, such that the RF radiation source receives its power via the electrical output.

At step 810, the method may include operatively connecting the processor to an RF monitoring system. At step 812, the method 800 may include monitoring, via the RF monitoring system, a power density within the area of concern and/or an RF radiation exposure level of a human within the area of concern.

At step 814, a determination is made whether a human is detected in the area of concern (via the AI camera). If not, the method 800 may stay at step 814 until a human is detected in the area of concern, after which the method 800 may proceed to step 816. At step 816, a determination is made whether the power density (PD) within the area of concern and/or whether RF exposure (EXP) within the area of concern exceeds a predetermined threshold. If so, the method 800 may continue with step 818 by opening the relay, via the processor, to temporarily interrupt power to the RF radiation source. In addition, the method 800 may continue at step 820 by generating an audible and/or visual warning and/or an electronic alert. In addition, the method 800 may continue at step 822 by logging entry of the object (human) into the area of concern. If the object is not human, however, the method 800 may bypass steps 818 and 820 to proceed with logging entry of the object into the area of concern at step 822.

In some configurations, detection that the power density or exposure exceeds the predetermined level in step 816 may initially result in generation of an audible and/or visual warning in step 820 in order to warn the human that the area of concern is unsafe. If the human stays in the area of concern for a predetermined or calculated period of time (e.g., a period of time calculated to keep RF exposure to the human below the MPE or some threshold thereof), as discussed in connection with Eq. (1) and Eq. (2), then step 818 (controlling the opening the relay) may be performed. In this way, the power and is not interrupted until the human has been warned and is approaching the MPE.

The systems and methods described herein can be implemented in hardware, software, firmware, or combinations of hardware, software and/or firmware. In some examples, systems described in this specification may be implemented using a non-transitory computer readable medium storing computer executable instructions (e.g., program code) that when executed by one or more processors of a computer cause the computer to perform operations. Computer-readable media suitable for implementing the control systems described in this specification include non-transitory computer-readable media, such as disk memory devices, chip memory devices, programmable logic devices, random access memory (RAM), read only memory (ROM), optical read/write memory, cache memory, magnetic read/write memory, flash memory, and application-specific integrated circuits. In addition, a computer readable medium that implements a control system described in this specification may be located on a single device or computing platform or may be distributed across multiple devices or computing platforms.

One skilled in the art will readily appreciate that the present disclosure is adapted to carry out the objects and obtain the ends and advantages mentioned, as well as those inherent therein. Changes and other uses will occur to those skilled in the art which are encompassed within the spirit of the present disclosure as defined by the scope of the claims.

No admission is made that any reference, including any non-patent or patent document cited in this specification, constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinence of any of the documents cited herein. All references cited herein are fully incorporated by reference, unless explicitly indicated otherwise. The present disclosure shall control in the event there are any disparities between any definitions and/or description found in the cited references.

What is claimed is:

1. A method for mitigating RF radiation exposure in an area of concern proximate to an RF radiation source, the method comprising:

operatively connecting one or more sensors to a processor of a control unit;

operatively connecting the processor to a relay disposed on an electrical path between an electrical input and an electrical output of a relay unit disposed remotely from the control unit, the relay unit comprising a communication interface operatively connected to the relay, the relay configured to selectively connect or disconnect the electrical input and the electrical output through the electrical path under control of the processor;

operatively connecting the communication interface of the relay unit to a communication interface of the control unit;

operatively connecting the electrical input to a power supply for the RF radiation source;

operatively connecting the processor to an RF monitoring system configured to monitor a power density of RF radiation within the area of concern or RF radiation exposure to an object within the area of concern;

operatively connecting the electrical output to the RF radiation source;

detecting, via the one or more sensors, that an object has entered the area of concern;

in response to detecting that the object has entered the area of concern, monitoring, via the RF monitoring system, the power density of RF radiation within the area of concern or the RF radiation exposure to the object within the area of concern;

determining, via the processor, that the power density of the RF radiation within the area of concern or the RF radiation exposure to the object within the area of concern exceeds a predetermined threshold;

in response to the determining, transmitting a command from the control unit to the relay unit via the communication interfaces to open the relay, thereby physically disconnecting the electrical path between the power supply and the RF radiation source to temporarily interrupt power to the RF radiation source; and closing the relay, via the processor, to restore the power to the RF radiation source at least in response to the one or more sensors detecting that the object has exited the area of concern.

2. The method of claim 1, wherein detecting that the object has entered the area of concern comprises detecting that the object has entered a region proximate to the RF radiation source where a power density of RF radiation within the area of concern or RF radiation exposure to the object within the area of concern exceeds a predetermined threshold when the RF radiation source is in operation.

3. The method of claim 1, wherein detecting that the object has entered the area of concern includes determining by an artificial intelligence (AI) camera that the object is a human.

4. The method of claim 1, wherein detecting that the object has entered the area of concern includes:

capturing one or more images via a camera;

transmitting the one or more images captured by the camera via a network to a machine learning system configured to distinguish humans from other types of objects; and receiving an indication from the machine learning system whether the object is a human.

5. The method of claim 4, wherein transmitting the one or more images captured by the camera via the network to the machine learning system includes transmitting the one or more images to a trained neural network.

6. The method of claim 1, wherein detecting that the object has entered the area of concern includes that the object has entered the area of concern using at least one of a proximity sensor, a motion detector, a barrier tip/lift sensor, or a photoelectric beam sensor.

7. The method of claim 1, wherein the communication interface of the control unit and the communication interface of the relay unit are wireless interfaces.

8. The method of claim 1, wherein the RF monitoring system is configured to monitor the RF radiation exposure to the object based, at least in part, on an amount of time that the object is within the area of concern, and wherein opening the relay to temporarily interrupt the power to the RF radiation source includes opening the relay at least in response to the RF radiation exposure to the object exceeding the predetermined threshold.

9. The method of claim 1, further comprising:

storing, in a memory, a log of each detected entry of each object into the area of concern.

10. The method of claim 9, wherein storing the log of each detected entry of each object into the area of concern comprises storing, in the log, at least one of a date of entry, a time of entry, a date of exit, a time of exit, and the power density of the RF radiation within the area of concern or the RF radiation exposure to the object within the area of concern as determined by the RF monitoring system.

11. The method of claim 9, the method further comprising:

capturing an image or video of the object; and storing the image or the video in the log.

12. The method of claim 1, further comprising:

displaying a warning sign at least in response to the power density of the RF radiation within the area of concern or the RF radiation exposure to the object within the area of concern exceeding the predetermined threshold when the one or more sensors detect that the object has entered the area of concern.

13. The method of claim 12, wherein displaying the warning sign includes displaying the warning sign using a sign projector configured for projecting the warning sign onto a surface in or proximate to the area of concern.

14. The method of claim 13, wherein projecting the warning sign includes projecting an indication of a time remaining to maximum permissible exposure (MPE) for the object.

15. The method of claim 1, further comprising emitting an audible warning at least in response to the power density of the RF radiation within the area of concern or the RF radiation exposure to the object within the area of concern exceeding the predetermined threshold when the one or more sensors detect that the object has entered the area of concern.

16. The method of claim 1, further comprising:

displaying a color-coded RF alert light at least in response to the power density of the RF radiation within the area of concern or the RF radiation exposure to the object within the area of concern exceeding the predetermined threshold.

17. The method of claim 1, further comprising:

sending an electronic alert at least in response to the power density of the RF radiation within the area of concern or the RF radiation exposure to the object within the area of concern exceeding the predetermined threshold when the one or more sensors detect that the object has entered the area of concern.

18. The method of claim 17, wherein sending the electronic alert includes sending one or more of an email, a text message, or a push notification.

19. A method for mitigating RF radiation exposure in an area of concern proximate to an RF radiation source, the method comprising:

operatively connecting one or more sensors to a processor of a control unit;

operatively connecting the processor to a relay disposed on an electrical path between an electrical input and an electrical output of a relay unit disposed remotely from the control unit, the relay unit comprising a communication interface operatively connected to the relay, the relay configured to selectively connect or disconnect the electrical input and the electrical output through the electrical path under control of the processor;

operatively connecting the communication interface of the relay unit to a communication interface of the control unit;

operatively connecting the electrical input to a power supply for the RF radiation source;

operatively connecting the electrical output to the RF radiation source;

operatively connecting the processor to an RF monitoring system configured to monitor a power density of RF radiation within the area of concern or RF radiation exposure to an object within the area of concern;

detecting, by the one or more sensors, that an object has entered or exited the area of concern proximate to the RF radiation source;

in response to detecting that the object has entered the area of concern, monitoring, via the RF monitoring system, the power density of RF radiation within the area of concern or the RF radiation exposure to the object within the area of concern;

determining, via the processor, that the power density of the RF radiation within the area of concern or the RF radiation exposure to the object within the area of concern exceeds a predetermined threshold;

in response to the determining, transmitting a command from the control unit to the relay unit via the communication interfaces to open the relay, thereby physically disconnecting the electrical path between the power supply and the RF radiation source to temporarily interrupt power to the RF radiation source;

logging, within a memory, one or both of the object entering or exiting the area of concern; and generating at least one of an audible warning or a visual warning to the object that has entered the area of concern.

20. The method of claim 19, further comprising sending an electronic alert to a remote server that the object has exited or entered the area of concern.

21. The method of claim 20, wherein the electronic alert includes one or more of an email, a text message, or a push notification.

22. The method of claim 19, wherein logging comprises logging at least one of a date of entry, a time of entry, a date of exit, and a time of exit.

23. The method of claim 19, further comprising:

capturing an image or a video of the object; and logging the image or the video within the memory.

24. The method of claim 19, wherein generating the visual warning includes projecting a warning sign by a sign projector onto a surface in or proximate to the area of concern.

25. The method of claim 24, wherein projecting the warning sign comprises projecting an indication of a time remaining to a maximum permissible exposure (MPE) for the object.

26. A non-transitory computer-readable medium storing program code that, when executed by one or more processors, cause the one or more processors to perform a method for mitigating RF radiation exposure in an area of concern proximate to an RF radiation source, wherein one or more sensors are operatively connected to a processor of a control unit, wherein the one or more processors are operatively connected to to a relay disposed on an electrical path between an electrical input and an electrical output of a relay unit disposed remotely from the control unit, wherein the relay unit includes a communication interface operatively connected to the relay, wherein the relay is configured to selectively connect or disconnect the electrical input and the electrical output through the electrical path under control of the processor, wherein the communication interface of the relay unit is operatively connected to a communication interface of the control unit, wherein the electrical input is operatively connected to a power supply for the RF radiation source, wherein the electrical output is operatively connected to the RF radiation source, and wherein the one or more processors are operative connected to an RF monitoring system configured to monitor a power density of RF radiation within the area of concern or RF radiation exposure to an object within the area of concern, the method comprising:

detecting, by one or more sensors, that an object has entered or exited the area of concern proximate to the RF radiation source;

in response to detecting that the object has entered the area of concern, monitoring, via the RF monitoring system, the power density of RF radiation within the area of concern or the RF radiation exposure to the object within the area of concern;

determining, via the processor, that the power density of the RF radiation within the area of concern or the RF radiation exposure to the object within the area of concern exceeds a predetermined threshold;

in response to the determining, transmitting a command from the control unit to the relay unit via the communication interfaces to open the relay, thereby physically disconnecting the electrical path between the power supply and the RF radiation source to temporarily interrupt power to the RF radiation source; and closing the relay, via the processor, to restore the power to the RF radiation source at least in response to the one or more sensors detecting that the object has exited the area of concern.

* * * * *